(12) United States Patent
Burton

(10) Patent No.: US 7,336,349 B1
(45) Date of Patent: Feb. 26, 2008

(54) SYSTEMS AND METHODS FOR DETERMINING A CONFIGURATION OF A BARGE COMPLEX

(75) Inventor: Charles E. Burton, Nathrop, CO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/558,165

(22) Filed: Nov. 9, 2006

(51) Int. Cl.
*G01B 11/26* (2006.01)
(52) U.S. Cl. .................................. 356/139.03
(58) Field of Classification Search ............ 356/139.03
See application file for complete search history.

(56) References Cited

U.S. PATENT DOCUMENTS

| | | | |
|---|---|---|---|
| 6,580,385 B1 | 6/2003 | Winner et al. | |
| 6,836,285 B1 | 12/2004 | Lubard et al. | |
| 7,014,003 B2 | 3/2006 | Polak | |
| 2003/0137658 A1* | 7/2003 | Ohtomo et al. | 356/141.4 |
| 2005/0090971 A1 | 4/2005 | Bulatao et al. | |
| 2005/0134440 A1 | 6/2005 | Breed | |
| 2005/0195383 A1 | 9/2005 | Breed et al. | |
| 2005/0278098 A1* | 12/2005 | Breed | 701/45 |

\* cited by examiner

*Primary Examiner*—Thomas H. Tarcza
*Assistant Examiner*—Luke D. Ratcliffe
(74) *Attorney, Agent, or Firm*—Armstrong Teasdale LLP

(57) ABSTRACT

In one aspect, a system for determining the configuration of a plurality of barges in a barge complex is described. The system includes at least one target positioned on predetermined ones of the plurality of barges, an angular measurement device positioned in a line of sight with the at least one target, the angular measurement device configured to determine at least one of a horizontal and a vertical angle between the at least one target and the angular measurement device, and a ranging device coupled to the angular measurement device, the ranging device configured to determine a distance between the at least one target and the ranging device.

23 Claims, 5 Drawing Sheets

SYSTEMS AND METHODS FOR DETERMINING A CONFIGURATION OF A BARGE COMPLEX

BACKGROUND OF THE INVENTION

This invention relates generally to barge navigation, and more particularly, to a determination of a configuration of a barge complex.

A barge is a large, flat-bottomed boat, designed to transport cargo. A plurality of barges, interconnected for simultaneous transport, is often referred to as a barge complex. The shape and configuration of a barge complex is dependent upon the number of barges in the complex and how they are interconnected.

Determining the configuration of a barge complex, or more specifically, the location of the corners of a barge complex, is important for barge complex navigation. Given the size of the individual barges, upwards of 175 feet by 26 feet, and the number of barges interconnected in a barge complex, often over 8 barges by 3 barges, determining the configuration may be a challenge. Knowing the location of the outside corners of a barge complex is particularly of interest while navigating through locks or under bridges. A barge complex may have only one or two feet of space on each side of the complex with which to enter a lock. A collision with a lock can damage the barges and also damage the lock, delaying lock traffic until repairs are made. Currently, overcoming these navigational challenges may be impossible in fog or other inclement weather since much of current barge navigation relies on sight. Often, workers are positioned at each corner of a barge complex and transmit estimates regarding the position of the corners with respect to a bridge or lock to the operator of the tow boat. This requires multiple workers and adequate visibility. Barge complexes are frequently forced to delay or interrupt a trip to wait for fog or other inclement weather to pass. This is not only an inconvenience, but also a financial detriment.

BRIEF DESCRIPTION OF THE INVENTION

In one aspect, a system for determining the configuration of a plurality of barges in a barge complex is provided. The system includes at least one target positioned on predetermined ones of the plurality of barges, an angular measurement device positioned in a line of sight with the at least one target, the angular measurement device configured to determine at least one of a horizontal and a vertical angle between the at least one target and the angular measurement device, and a ranging device coupled to the angular measurement device, the ranging device configured to determine a distance between the at least one target and the ranging device.

In another aspect, a method for determining the configuration of a plurality of barges of a barge complex is provided. The method includes locating at least one target at predetermined positions on the plurality of barges, directing an angular measurement device in a line of sight with the at least one target, directing a range detection beam toward the at least one target from a ranging device and configuring the ranging device to determine a distance to at least one target, receiving a reflection of the range detection beam at the ranging device, and determining a location of the at least one target with respect to the location of the angular measurement device.

In yet another aspect, a measurement system including a ranging device coupled to an angular measurement device is provided. The system is configured to locate a periphery of a barge complex from a single position.

DETAILED DESCRIPTION OF THE INVENTION

The systems and methods described herein are sometimes described in the context of a barge complex. Such systems and methods, however, are not limited to practice in connection with just barge complexes and can be used in connection with other forms of shipping. As used herein, the term barge complex may also refer to cargo ships and the term barge may also refer to containers within a cargo ship.

Figure 1:
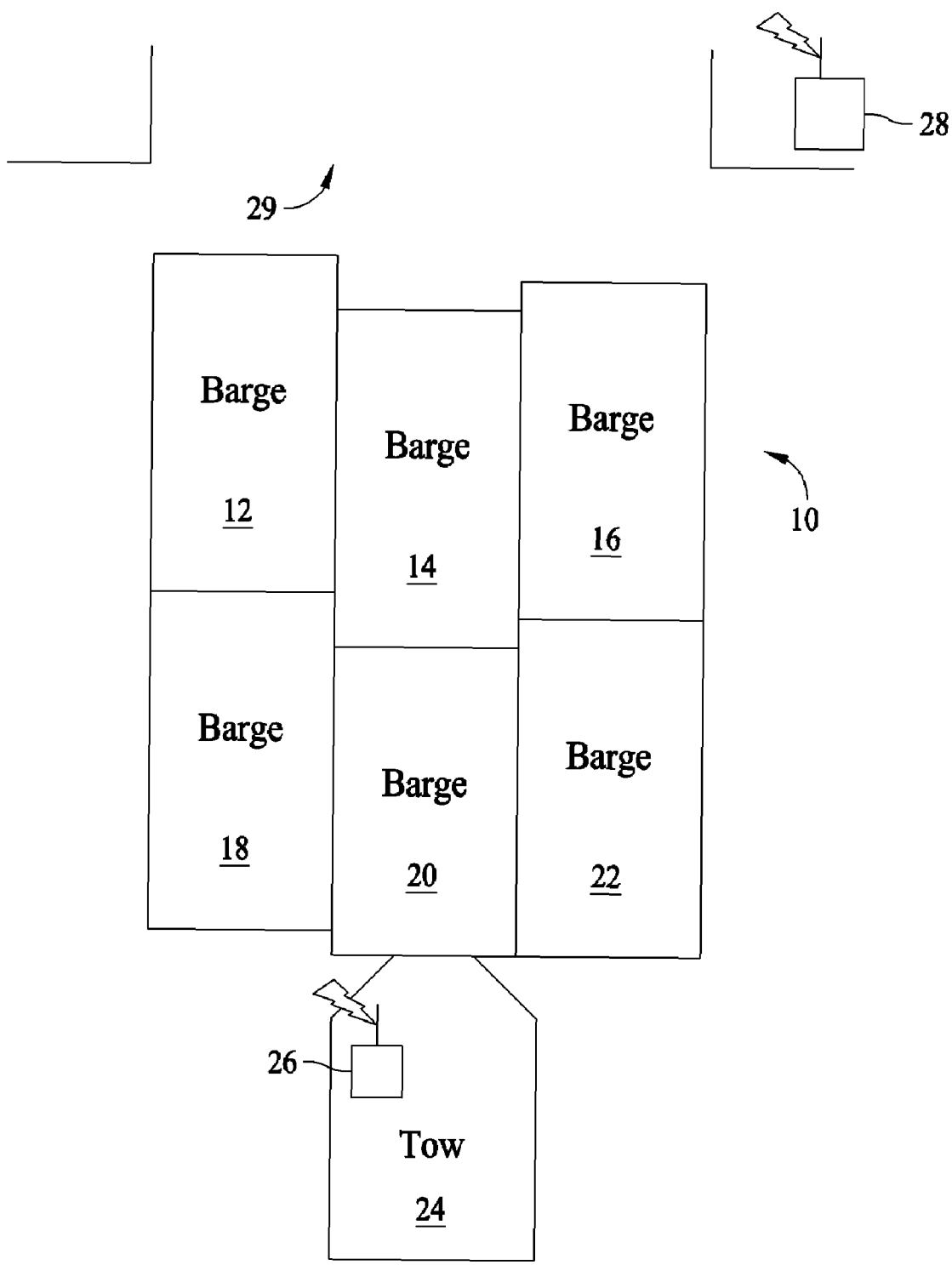
FIG. 1 is a schematic illustration of an exemplary barge complex.

FIG. 1 is a schematic illustration of an exemplary embodiment of a barge complex 10. Exemplary barge complex 10 includes a plurality of barges 12, 14, 16, 18, 20, and 22. Barge complex 10 is propelled and directed by a tow boat 24. Examples of tow boat 24 include, but are not limited to, a tug boat, or a self-propelled barge positioned either behind or within barge complex 10.

A lock navigation aid referred to as SmartLock is known in the shipping industry. The system consists of wirelessly linked computers, for example computers 26 and 28, on a tow boat and a lock, which display navigational charts showing the position of the tow boat as it approaches and enters a lock 29. Computer 26 on tow boat 24 communicates with computer 28, in one example, on the entrance to lock 29. However, computer 26 on tow boat 24 must be provided with information on the length and configuration of the barges within the barge complex that tow boat 24 is propelling. This information is provided to computer 26 by a user.

Due in part to the large size of a barge complex, the many possible configurations of the barges within the complex, and the fact that there is not a single, standard barge size currently used for shipping, it is a challenge to obtain an exact location of the corners of barge complex 10. However, the location of these outside corners is important for effective navigation.

Figure 2:
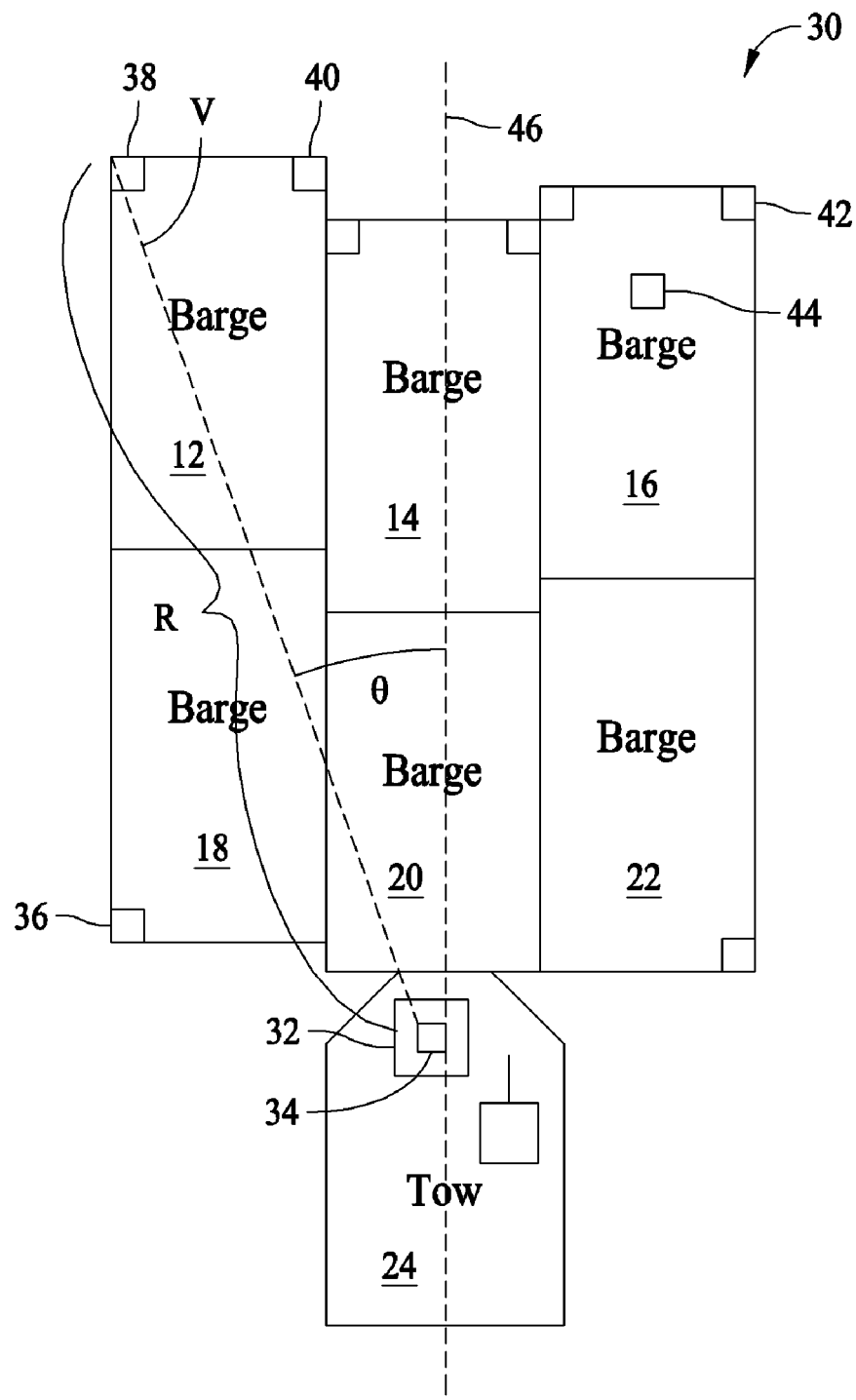
FIG. 2 is a schematic illustration of an exemplary barge complex including a system for determining the configuration of barges within the barge complex.

FIG. 2 is a schematic illustration of a barge complex 30 including a system for determining the configuration of barges within a barge complex. In this exemplary embodiment, an angular measurement device 32 is positioned on tow boat 24. Angular measurement device 32 may be an astronomical tripod or mount, a protractor and a needle, an angle encoder, a head tracking device, or any other device capable of measuring angles. A ranging device 34 is attached to angular measurement device 32. At least one reflective target is positioned on barge complex 30, for example, targets 36, 38, 40, 42, and 44, are positioned at predetermined positions on barge complex 30. In an exemplary embodiment, predetermined positions on barge complex 30 may be corners that are of interest to an operator of barge complex 30, such as targets 36, 38, 40, and 42. In another exemplary embodiment, predetermined positions on barge complex 30 may be elsewhere on barge complex 30, at a position such as target 44. If the position of a corner of interest of barge complex 30 is known, relative to target 44, once the position of target 44 is determined, the position of the corner can also be determined. The number of targets used depends on the configuration of barge complex 30 and the number of positions on barge complex 30 that are of interest to a user. Targets 36, 38, 40, 42, and 44 may be a mirrored surface, a reflective tape, or any other surface or coating that adequately reflects the electromagnetic radiation emitted by ranging device 34 toward the target, and back to ranging device 34. In an exemplary embodiment, the electromagnetic radiation emitted by ranging device 34 is light waves. In another exemplary embodiment, the electromagnetic radiation emitted by ranging device 34 is radio waves. The adequacy of the reflection is dependent upon the strength of ranging device 34 and the wavelength of the radiation emitted by ranging device 34.

In an exemplary embodiment, ranging device 34 is mounted to a rotatable portion of angular measurement device 32. The rotatable portion of angular measurement device 32 may allow ranging device 34 to rotate about a plurality of axis, including, a horizontal axis and a vertical axis, and be aimed at the plurality of targets. Ranging device 34 may be configured to be manually rotated and aimed by a user, or automatically rotated and aimed. An example of a device that may be used to automatically rotate and aim ranging device 34 is an automated pan and tilt unit. In another exemplary embodiment, ranging device 34 is fixably mounted to angular measurement device 32. Ranging device 34 may include a phased array to control the direction of the signal emitted by ranging device 34.

In operation, ranging device 34 is configured to measure a distance, R, between ranging device 34 and at least one of the plurality of targets 36, 38, 40, 42, and 44. In an exemplary embodiment, ranging device 34 is a light detecting and ranging (LIDAR) device. This LIDAR device may be a standard police LIDAR device such as the Stalker® Handheld Lidar produced by Applied Concepts, Inc. of Plano, Tex. The LIDAR device transmits a pulse of light and measures the time delay between transmission of the pulse and receipt of a reflected pulse. This time delay is mathematically converted to a distance. In another exemplary embodiment, ranging device 34 is a radio detection and ranging (RADAR) device, a laser ranging device, or any other device capable of measuring the distance, R.

In operation, angular measurement device 32 is configured to measure at least two angles. A first angle is a horizontal component, θ, of vector, V, representing the angle between a reference such as a longitudinal center axis 46 of barge complex 30 and vector, V. Vector, V, extends between angular measurement device 32 and one of the plurality of targets 36, 38, 40, 42, and 44. In the embodiment of FIG. 2, angle θ is the angle between longitudinal center axis 46 of barge complex 30 and a horizontal component of vector V.

Figure 3:
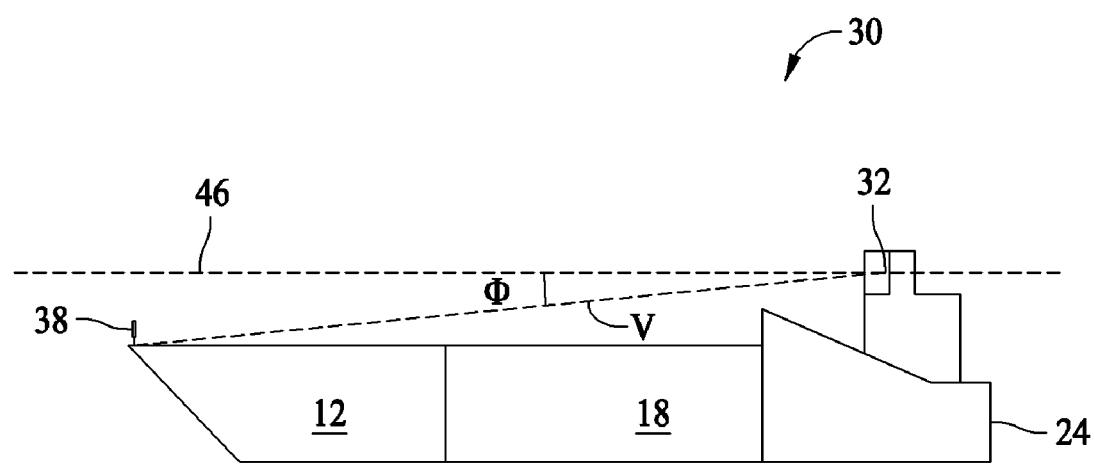
FIG. 3 is a schematic illustration of a side view of a barge complex.

FIG. 3 illustrates a side elevation view of barge complex 30 shown in FIG. 2. In the exemplary embodiment, tow boat 24 is positioned aft of barges 12 and 18. In the exemplary embodiment, angular measurement device 32 is further configured to measure a second component of vector, V. More specifically, the second component is a vertical component, Φ, representing the angle between longitudinal center axis 46 of barge complex 30 and vector, V. Vector, V, as described above, extends between angular measurement device 32 and one of the plurality of targets 36, 38, 40, 42, and 44. Longitudinal center axis 46 extends from the position of angular measurement device 32 on tow boat 24, parallel to the water tow boat 24 is traversing. In the exemplary embodiment shown in FIG. 3, angular measurement device 32 is positioned within a control house of tow boat 24, however, angular measurement device 32 may be positioned at any known location relative to the bridge or control house.

A location of each target relative to the angular measurement device 32 may be calculated using known formulas and applying the measured distance, R, horizontal angle, θ, and vertical angle, Φ. Also, a location of each target relative to any other specified location on barge complex 30, for example, center axis 46 or the control house of tow boat 24, may be calculated using known formulas, so long as the location of the angular measurement device 32 relative to the specified location is known.

Figure 4:
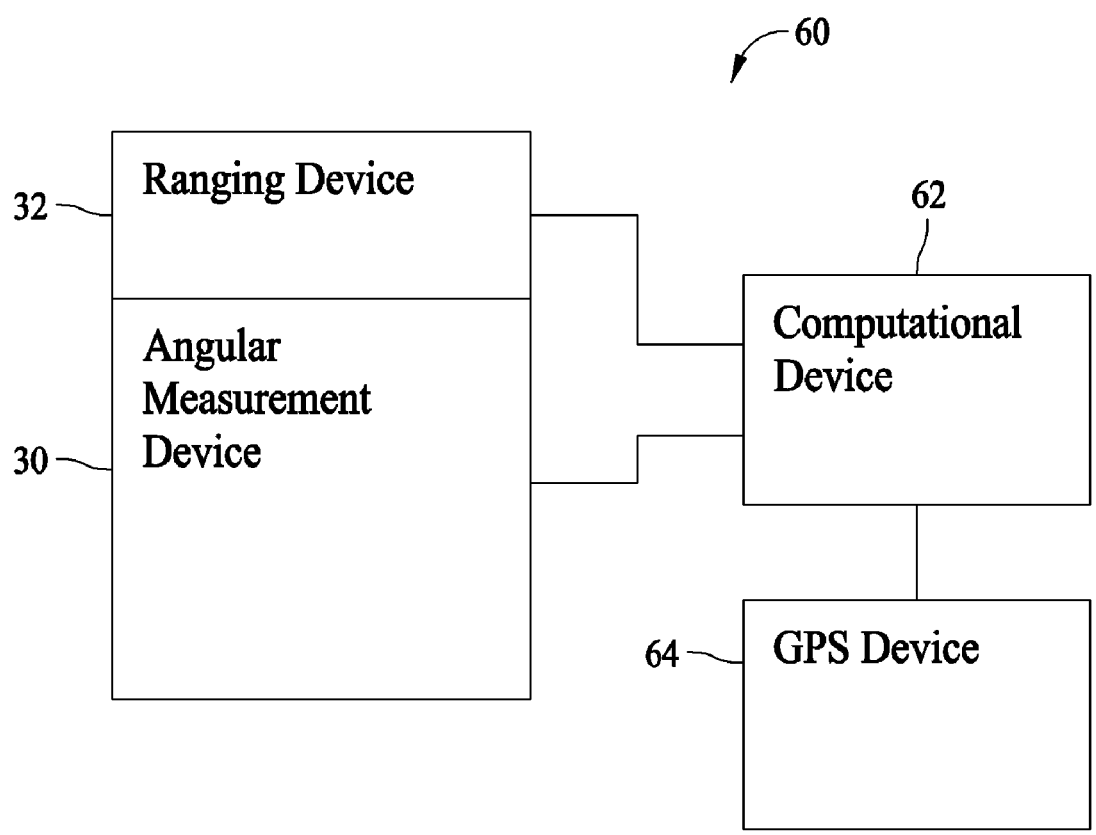
FIG. 4 is a block diagram of an exemplary embodiment of a system for determining the configuration of barges within a barge complex

FIG. 4 is a block diagram of an exemplary embodiment of a system 60 for determining the configuration of barges within a barge complex that includes a computational device 62. Computational device 62 is configured to calculate the location of each target relative to the angular measurement device 32, as described above. As shown in FIG. 4, system 60 includes angular measurement device 32 coupled to ranging device 34. In one embodiment, shown in FIG. 4, angular measurement device 32 and ranging device 34 are communicatively coupled to computational device 62, via separate computational device 62 inputs. In an alternative embodiment, angular measurement device 32 and ranging device 34 are communicatively coupled to computational device 62 via a single computational device 62 input. In another alternative embodiment, angular measurement device 32 and ranging device 34 are wirelessly coupled to computational device 62. Examples of wireless protocols that may be used are Bluetooth™, IEEE 802.11(a), IEEE 802.11(b), IEEE 802.11(g), IEEE 802.11(n), IEEE 802.15.4, and ZigBee™, although any other type of network link may be substituted.

In example embodiments, computation device 62 may include one or more of a microprocessor, processor, microcontroller, microcomputer, programmable logic controller, application specific integrated circuit, and other programmable circuits. In another alternative embodiment, system 60 may include a global positioning system (GPS) device 64 communicatively coupled to computational device 62. GPS device 64 may provide at least one of a latitude, a longitude, and an altitude to computational device 62. In another alternative embodiment of system 60, computational device 62 may include built-in GPS capabilities.

Figure 5:
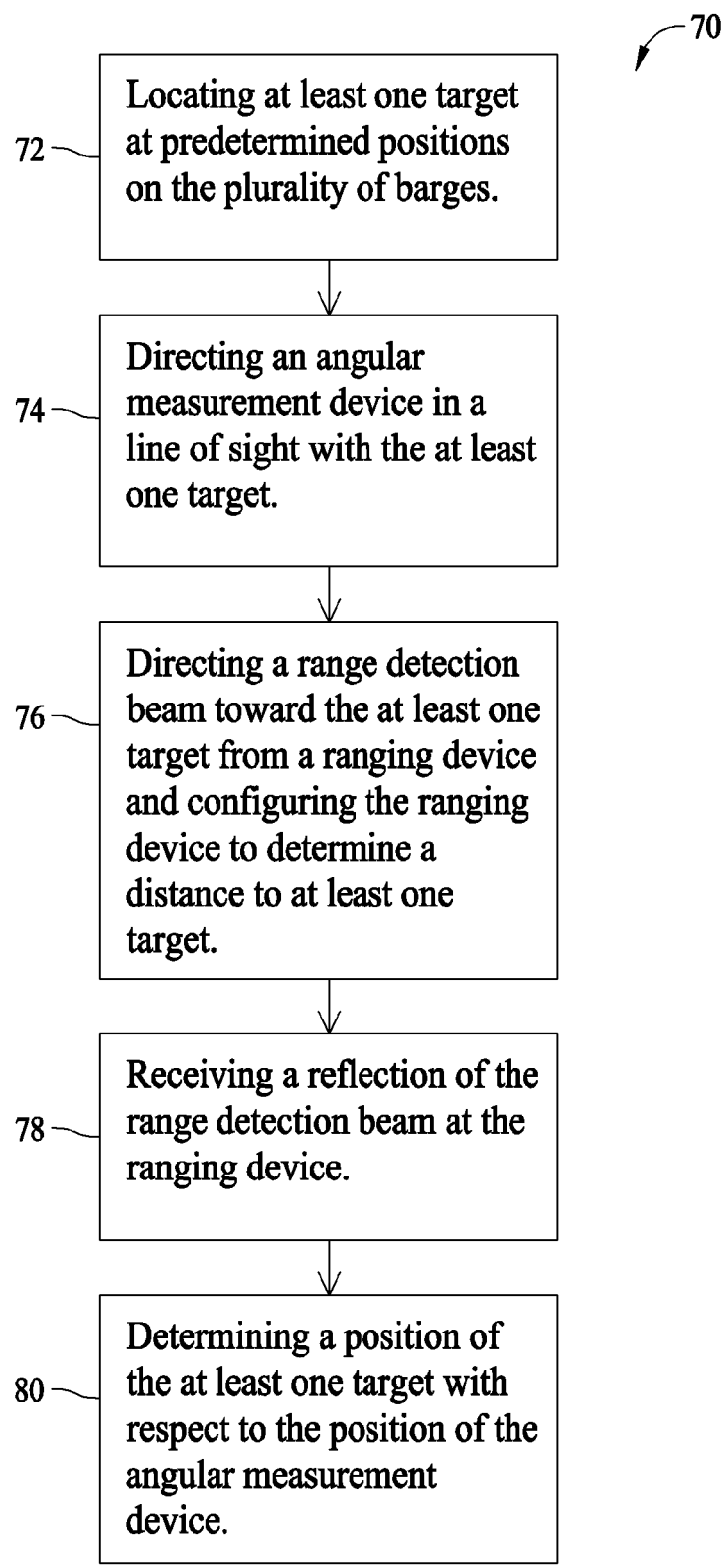
FIG. 5 is a flow chart illustrating steps associated with a method of determining the configuration of barges within the barge complex of FIG. 1.

FIG. 5 is a flow chart of a method 70 for determining the configuration of a barge complex. Method 70 includes locating 72 at least one target at predetermined positions on the plurality of barges. Method 70 also includes directing 74 an angular measurement device in a line of sight with the at least one target. Directing 74 the angular measurement device includes configuring the angular measurement device to measure at least one of a horizontal and a vertical angle with respect to the location of the angular measurement device.

Method 70 further includes directing 76 a range detection beam toward the at least one target from a ranging device and configuring the ranging device to determine a distance to at least one target. Configuring the ranging device to determine a distance includes aligning the ranging device such that a signal emitted from ranging device is aimed at a target. This alignment may be performed manually by a user, as described above, by rotating the ranging device about the rotatable portion of the angular measurement device. This alignment may also be performed automatically. In one embodiment, an automated pan and tilt mechanism is configured to align the ranging device with a target. In another embodiment, the ranging device includes a phased array that is configured to direct the emitted signal in a predetermined direction, for example, toward a predetermined one of the plurality of targets.

Method 70 still further includes receiving 78 a reflection of the range detection beam at the ranging device. From the measured time delay between transmitting 76 the range detection beam toward the at least one target and receiving 78 the reflection of the range detection beam, a distance can be determined. Method 70 still further includes determining 80 a position of the at least one target with respect to the position of the angular measurement device. Determining 80 a location of the at least one target may include configuring a computational device to receive a distance from the ranging device and at least one angle from the angular measurement device and then to calculate the location of at least one target using that information. Method 70 may also include providing a coordinate output from a global positioning system (GPS) device to the computational device, the coordinate output including at least one of a latitude, a longitude, and an altitude, and configuring the computational device to calculate coordinates of each of the at least one target. This allows a user to obtain the geographical coordinates of multiple targets while using only one GPS device.

Method 70 may be manually performed by a user, or automatically performed by an automated system, to determine the location of any number of individual targets. From the locations of these targets, a configuration of the barge complex can be determined. Method 70 may also include configuring the ranging device and the angular measurement device to monitor the locations of the plurality of targets. An automated pan and tilt mechanism or a ranging device that includes phased array capabilities may be configured to constantly monitor the locations of the targets. A method of monitoring may include configuring the ranging device and the angular measurement device to monitor the location of the targets and alert a user upon determining that at least one target has moved more than a predetermined amount as compared to the other targets or as compared to the angular measurement device.

While the invention has been described in terms of various specific embodiments, those skilled in the art will recognize that the invention can be practiced with modification within the spirit and scope of the claims.

What is claimed is:

1. A system for determining the configuration of a plurality of barges in a barge complex, said system comprising:
   at least one target positioned on predetermined ones of the plurality of barges;
   an angular measurement device positioned in a line of sight with said at least one target, said angular measurement device configured to determine at least one of a horizontal and a vertical angle between said at least one target and said angular measurement device; and
   a ranging device coupled to said angular measurement device, said ranging device configured to determine a distance between said at least one target and said ranging device.

2. The system according to claim 1 wherein said ranging device comprises at least one of a light detection and ranging device (LIDAR), a radio detection and ranging device (RADAR), an optical ranging device, and a laser ranging device.

3. The system according to claim 1 wherein said angular measurement device is configured to measure at least one of a horizontal and a vertical angle between said at least one target and said angular measurement device.

4. The system according to claim 3 wherein the vertical angle comprises an angle from a reference axis at the elevation of said ranging device to the vector between said ranging device and said target, and a horizontal angle comprises an angle between the reference axis and a horizontal component of the vector between said ranging device and said target.

5. The system according to claim 1 wherein said ranging device further comprises global positioning system (GPS) capabilities, said capabilities comprising receiving coordinates from a GPS receiver and determining the coordinates of said at least one target.

6. The system according to claim 1 further comprising a computational device communicatively coupled to said ranging device, said computational device configured to determine a location of each of said at least one target using the distance between each said target and said ranging device, and the respective angles to each said target.

7. The system according to claim 6 wherein said computational device further comprises at least one of built-in GPS capabilities and a GPS device communicatively coupled to said computational device, said computational device configured to receive coordinates including at least one of a latitude, a longitude, and an altitude, and further configured to calculate coordinates of said at least one target.

8. The system according to claim 1 wherein said angular measurement device comprises at least one of an astronomical tripod, a protractor and a needle, an angle encoder, and a head tracking device.

9. The system according to claim 8 wherein said head tracking device is configured to measure at least one of a head roll, a pitch, and a yaw.

10. The system according to claim 1 wherein said at least one target is positioned on predetermined ones of the plurality of barges in a predetermined location.

11. The system according to claim 1 wherein said at least one target is positioned at a corner of the barge complex located along the periphery of the barge complex.

12. The system according to claim 1 wherein said at least one target comprises a predetermined portion of the plurality of barges including a reflective surface, wherein said reflective surface is configured to reflect at least one of light and radio waves.

13. A method for determining the configuration of a plurality of barges of a barge complex, said method comprising:
   locating at least one target at predetermined positions on the plurality of barges;
   directing an angular measurement device in a line of sight with the at least one target;
   directing a range detection beam toward the at least one target from a ranging device and configuring the ranging device to determine a distance to at least one target;
   receiving a reflection of the range detection beam at the ranging device; and
   determining a position of the at least one target with respect to the position of the angular measurement device.

14. The method according to claim 13 wherein directing an angular measurement device further comprises configuring the angular measurement device to measure at least one of a horizontal and a vertical angle to the at least one target.

15. The method according to claim 13 wherein determining a position of the at least one target with respect to the position of the angular measurement device includes configuring a computational device to:
receive at least one distance from the ranging device;
receive a plurality of angles from the angular measurement device; and
perform calculations to identify the position of the at least one target with respect to the position of the angular measurement device.

16. The method according to claim 13 further comprising providing a coordinate output from a global positioning system (GPS) device to the computational device, the coordinate output including at least one of a latitude, a longitude, and an altitude, and configuring the computational device to calculate coordinates of each of the at least one target.

17. The method according to claim 13 wherein locating at least one target further comprises configuring an automatic angular measurement device to continuously monitor the locations of the at least one target.

18. The method according to claim 17 wherein configuring the automatic angular measurement device further comprises configuring at least one of the angular measurement device and the computational device to alert a user of a change in relative position of the at least one target.

19. A measurement system comprising a ranging device coupled to an angular measurement device, said system configured to locate a periphery of a barge complex from a single position.

20. The measurement system according to claim 19 wherein said angular measurement device is configured to measure at least one angle.

21. The measurement system according to claim 20 wherein the at least one angle said angular measurement device is configured to measure is an angle separating a longitudinal axis of the barge from the location of the corners of the barge complex.

22. The measurement system according to claim 19 further comprising a computational device in communication with said ranging device and said angular measurement device, said computational device configured to receive data from said ranging device and calculate a position of the corners of the barge complex with respect to the ranging device.

23. A measurement system according to claim 22 wherein the positions of the corners of the barge complex comprise a range component and at least one angular component.

* * * * *